United States Patent [19]

Fukui et al.

[11] Patent Number: 5,091,462
[45] Date of Patent: Feb. 25, 1992

[54] THERMOPLASTIC RESIN COMPOSITION

[75] Inventors: Osamu Fukui, Kamakura; Kiyoshi Tsutsui, Sakai; Tomohiko Akagawa, Sakai; Ikunori Sakai, Sakai; Takao Nomura, Toyota; Takeyoshi Nishio, Okazaki; Toshio Yokoi; Nobuya Kawamura, both of Toyota, all of Japan

[73] Assignees: Ube Industries Limited, Yamaguchi; Toyota Jidosha Kabushiki Kaisha, Aichi, both of Japan

[21] Appl. No.: 493,459

[22] Filed: Mar. 14, 1990

[30] Foreign Application Priority Data

Mar. 17, 1989 [JP] Japan ................................. 1-65105

[51] Int. Cl.[5] .......................... C08L 51/00; C08K 3/34
[52] U.S. Cl. ..................................... 524/504; 524/445
[58] Field of Search ................................ 524/445, 504

[56] References Cited

U.S. PATENT DOCUMENTS

| | | | |
|---|---|---|---|
| 4,381,366 | 4/1983 | Sanderson | 524/504 |
| 4,537,929 | 8/1985 | Nangrani | 524/504 |
| 4,804,703 | 2/1989 | Subramanian | 524/445 |
| 4,889,885 | 12/1989 | Usuki | 524/445 |

Primary Examiner—Paul R. Michl
Assistant Examiner—Peter Szekely
Attorney, Agent, or Firm—Nixon & Vanderhye

[57] ABSTRACT

A polypropylene thermoplastic resin composition comprising (a) a modified crystalline polypropylene of a crystalline polypropylene comprising said modified crystalline polypropylene and (b) a modified polyamide obtained by partially or wholly grafting a polyamide with a clay mineral. A polypropylene thermoplastic resin composition comprising, in addition to the above polypropylene thermoplastic resin composition comprising the components (a) and (b), one or any combination of the following components (c), (d) and (e): (c) an ethylene-α-olefin copolymer rubber or a modified ethylene-α-olefin copolymer rubber, (d) a block copolymer between a monovinyl-substituted aromatic hydrocarbon and a conjugated diene, a hydrogenation product of said block copolymer, or a modification product of said block copolymer, and (e) an inorganic filler. The modified polyamide as the component (b), obtained by modifying a polyamide with a clay mineral has good compatibility with or good dispersibility in the component (a), i.e. the modified crystalline polypropylene or the crystalline polypropylene comprising the modified crystalline polypropylene. Therefore, the polypropylene thermoplastic resin composition comprising these components (a) and (b) has excellent heat resistance and excellent impact resistance.

5 Claims, No Drawings

THERMOPLASTIC RESIN COMPOSITION

BACKGROUND OF THE INVENTION AND RELATED ART STATEMENT

The present invention relates to a thermoplastic resin composition superior in heat resistance, impact resistance, mar resistance, water resistance and surface gloss.

Crystalline polypropylenes are superior in mechanical properties and moldability and used in wide applications, but are not satisfactory in heat resistance and impact resistance when used in industrial parts. It has conventionally been conducted to add an inorganic filler to a crystalline polypropylene to improve the heat resistance of the latter, or to add an ethylene-α-olefin copolymer rubber or a polyethylene to a crystalline polypropylene to improve the impact resistance of the latter; however, the addition of an inorganic filler significantly reduces the impact resistance of polypropylene and the addition of an ethylene-α-olefin copolymer rubber or a polyethylene reduces the rigidity, heat resistance and oil resistance of polypropylene. Even the combined addition of an inorganic filler and an ethylene-α-olefin copolymer rubber or a polyethylene to a polypropylene does not give an effect more than the sum of addition effects of respective additives, and accordingly provides no sufficient method for improvement of polypropylene in heat resistance and impact resistance.

Meanwhile, there was made an attempt of adding a polyamide to a polypropylene to improve the heat resistance, oil resistance, etc. of polypropylene without reducing the impact resistance of polypropylene. However, since there is no compatibility between polypropylene and polyamide, they cause delamination and no desired material can be obtained when they are melt mixed as they are. Hence, there was used, in place of a polypropylene, a modified polypropylene obtained by grafting a polypropylene with an unsatuated carboxylic acid or a derivative of an unsaturated carboxylic acid (Japanese Patent Publication No. 30945/1970). This approach makes a polypropylene and a polyamide to be compatible with each other and can improve the heat resistance of polypropylene without reducing the impact resistance of polypropylene.

However, even in the above improvement of polypropylene by addition of polyamide, the improvement effect is not satisfactory as long as there is used, as the polyamide, an ordinary polyamide such as nylon-6, nylon-6,6, nylon-12 or the like. Recently there has been made a proposal of adding an aromatic polyamide and a glass fiber to a polypropylene to obtain a material of high strength and low water absorbability [Japanese Patent Application Kokai (Laid-Open) No. 203654/1985]. This proposal if not sufficient when viewed from the improvement of polypropylene in both heat resistance and impact resistance. In order to significantly improve the heat resistance and impact resistance of polypropylene by addition of polyamide thereto, the dispersibility of polyamide particles in polypropylene and the cohesivenenss among polyamide particles are very important. The improvement of polyamide particles in these properties has been necessary.

SUMMARY OF THE INVENTION

The present inventors made study to find a polyamide which can be added to a polypropylene to significantly improve the heat resistance, impact resistance, etc. of polypropylene, particularly a polyamide whose particles are highly dispersible in a polypropylene and have a sufficiently high cohesiveness among themselves. As a result, it was found that the addition of a particular modified polyamide to a polypropylene can provide a polypropylene thermoplastic resin composition which is superior to conventional polypropylene-polyamide mixtures in heat resistance, impact resistance, mar resistance, deformation of molded article, etc. The finding has led to the completion of the present invention.

The polypropylene composition of the present invention comprising a particular modified polyamide, as compared with polypropylene compositions comprising an ordinary polyamide, has about the same moldability but is remarkably improved in heat resistance and impact resistance and also improved in mechanical strengths, deformation of molded article, etc. These are the major characteristics of the present composition.

According to the present invention, there is provided a polypropylene thermoplastic resin composition comprising:

95-5% by weight of (a) a modified polypropylene obtained by grafting a crystalline polypropylene with an unsaturated carboxylic acid or/and a derivative of an unsaturated carboxylic acid, or a crystalline polypropylene comprising at least 5% by weight of said modified polypropylene, and 5-95% by weight of (b) a modified polyamide obtained by partially or wholly modifying a polyamide with a clay mineral.

According to the present invention, there is also provided a polypropylene thermoplastic resin composition comprising:

100 parts by weight of the above polypropylene thermoplastic resin composition comprising the components (a) and (b), and 1-100 parts by weight of (c) an ethylene-α-olefin copolymer rubber or a modified ethylene-α-olefin copolymer rubber obtained by partially or wholly grafting an ethylene-α-olefin copolymer rubber with an unsaturated carboxylic acid or/and a derivative of an unsaturated carboxylic acid.

According to the present invention, there is also provided a polypropylene thermoplastic resin composition comprising:

100 parts by weight of the above polypropylene thermoplastic resin composition comprising the components (a) and (b), and 1-100 parts by weight of (d) a block copolymer represented by the general formula A—(B—A)$_n$ (A is a polymer block of a monovinyl-substituted aromatic hydrocarbon, B is an elastomeric polymer block of a conjugated diene, and n is an integer of 1-5), a hydrogenated block copolymer obtained by hydrogenating said block copolymer, or a modified block copolymer obtained by grafting said block copolymer with an unsaturated carboxylic acid or/and a derivative of an unsaturated carboxylic acid.

According to the present invention, there is also provided a polypropylene thermoplastic resin composition comprising:

100 parts by weight of the above polypropylene thermoplastic resin composition comprising the components (a) and (b), and 5-150 parts by weight of (e) an inorganic filler.

According to the present invention, there is also provided a polypropylene thermoplastic resin composition comprising:
- 100 parts by weight of the above polypropylene thermoplastic resin composition comprising the components (a) and (b), and
- any combination of 1-100 parts by weight of the above component (c), 1-100 parts by weight of the above component (d) and 5-150 parts by weight of the above component (e).

DETAILED DESCRIPTION OF THE INVENTION

The crystalline polypropylene used in the present invention in the component (a) or for preparation of the component (a) can be any of a crystalline homopolymer of propylene, an ethylene-propylene random or block copolymer or their mixture, each having a melt index of 0.3-70 g/10 min as measured by ASTM D 1238 (230° C., 2,160 g). It is preferable that the ethylene-propylene random copolymer have an ethylene content of 5 parts by weight or less and the ethylene-propylene block copolymer have an ethylene content of 3-15 parts by weight.

Of the above crystalline polypropylenes, particularly preferable is an ethylene-propylene block copolymer having a melt index of 0.3-50 g/10 min and an ethylene content of 3-10 parts by weight.

The modified polypropylene used in the present invention as or in the component (a) can be obtained by grafting the above crystalline polypropylene with a graft monomer. As the graft monomer, there is used an unsaturated carboxylic acid or a derivative thereof.

As the unsaturated carboxylic acid or its derivative, there can be mentioned acrylic acid, methacrylic acid, maleic acid, itaconic acid, fumaric acid, citraconic acid, crotonic acid, glycidyl methacrylate, 2-hydroxyethyl methacrylate, polyethylene glycol dimethacrylate, N-methylolmethacrylamide, calcium methacrylate, gammamethacryloxypropyltrimethoxysilane, acrylamide, methacrylamide, maleic anhydride, itaconic anhydride, citraconic anhydride, etc. An acid anhydride such as maleic anhydride, itaconic anhydride or the like is preferable.

The initiator for graft reaction has no particular restriction and can be any as long as it has a half-life period of one minute and its decomposition temperature for obtaining said half-life period is not lower than the melting point of the material polypropylene and not higher than 250° C. When the required decomposition temperature is higher than 250° C., the amount of radical generated at the time of grafting is small and resultantly no efficient graft reaction takes place in some cases. Such initiators include, for example, organic peroxides such as hydroperoxides, dialkyl peroxides, peroxyesters and the like. As the organic peroxides used in the present invention, there can be mentioned, for example, tert-butyl peroxybenzoate, cyclohexanone peroxide, 2,5-dimethlyl-2,5-di(benzoylperoxy)hexane, tert-butyl peroxyacetate, methyl ethyl ketone peroxide, dicumyl peroxide and 2,5-dimethyl- 2,5-di(tert-butylperoxy)hexane. In actual use, an appropriate initiator can be selected depending upon the reaction conditions, etc.

The acid-grafted crystalline polypropylene can be obtained by mixing the crystalline polypropylene, the graft monomer and the initiator and then kneading them in a nitrogen current or air, or by dissolving the crystalline polypropylene in toluene or xylene with heating under pressure and then dropwise adding there to the graft monomer and the initiator with stirring. The melt kneading may be conducted using a kneader such as double-screw extruder, kneader, Banbury mixer or the like, but can usually be conducted using a single-screw extruder. The mixing temperature is higher than the melting point of the material polypropylene and usually about 175°-280° C. The melt mixing time varies depending upon the materials but is generally about 1-20 minutes.

The mixing proportions of the materials are 100 parts by weight of the material polypropylene, about 0.05-5 parts by weight, preferably 0.1-3.0 parts by weight of the graft monomer and about 0.002-1 part by weight of the initiator.

When the proportion of the graft monomer is less than about 0.05 part by weight, no modification effect by grafting is obtained. When the proportion is more than 5 parts by weight, the grafting efficiency of the graft monomer is extremely low and the amount of the unreacted graft monomer is large.

The thus obtained modified polypropylene preferably has a grafting degree of at least 0.03 part by weight, preferably 0.1-0.5 parts by weight and a melt index of 0.5-200 g/10 min. When the melt index is smaller than 0.5 g/10 min, the composition obtained by melt mixing the modified polypropylene with a polyamide has low moldability in some cases. When the melt index is larger than 200 g/10 min, the molecular weight is too high, making it impossible to obtain a material of desired properties.

The modified polyamide resin used in the present invention as the component (b) can be obtained by uniformly dispersing 0.05-10 parts by weight, preferably 0.1-7 parts by weight of a particular clay mineral in 100 parts by weight of a polyamide, and has greatly improved heat resistance. When the proportion of the clay mineral is less than 0.05 part by weight, the resulting modified polyamide has no improvement in heat resistance. When the proportion is more than 15 parts by weight, the composition comprising the resulting modified polyamide and the component (a) has very low fluidity when melted, making its injection molding impossible in some cases.

The polyamide resin used for the preparation of the modified polyamide of the present invention includes polyamides obtained by polycondensing an aliphatic, alicyclic or aromatic diamine and an aliphatic, alicyclic or aromatic dicarboxylic acid; polyamides obtained from a lactam; polyamides obtained by condensing an aminocarboxylic acid; and polyamides obtained by copolymerizing said components. Specifically, there can be mentioned nylon-6, nylon-6,6, nylon-6,10, nylon-9, nylon-11, nylon-12, nylon-6/6,6, nylon-12,12, etc.

The clay mineral used for modifying the polyamide consists mainly of a silicate of layer structure having four sides each of usually 0.002-1 μm and a thickness of 6-20 Å. The clay mineral consisting of such a silicate of layer structure includes, for example, phyllosilicate minerals consisting of a magnesium silicate or aluminum silicate layer. Specifically there can be mentioned smectite clay minerals such as montmorillonite, saponite, beidellite, nontronite, hectorite, stevensite and the like; vermiculite; halloysite; and so forth. These clay minerals may be natural products or synthetic products. Of them, montmorillonite is particularly preferable.

It is preferable that each layer of the layer structure silicate be uniformly dispersed in the polyamide, at least 20 Å (on average) apart from other layers. The method for uniformly dispersing the layer structure silicate in the polyamide has no particular restriction. However, when the layer structure silicate is a multilayered clay mineral, there may be adopted a method wherein the multilayered clay mineral is contacted with a swelling agent to widen the distance between the adjacent layers of the clay mineral for later easy penetration of polyamide monomer into between said layers and then mixed with a polyamide monomer, followed by polymerization [Japanese Patent Application Kokai (Laid-Open) Nos. 64827/1987, 72723/1987 and 74957/1987]. There may also be adopted a method wherein the layer-to-layer distance of a multilayered clay mineral is widened to at least 100 Å with a swelling agent consisting of a high-molecular compound and the resulting clay mineral is melt kneaded with a polyamide.

The modified polyamide resin of the present invention can be used alone or in admixture with other modified polyamide resin or an ordinary polyamide resin.

The ethylene-α-olefin copolymer rubber used in the present invention as the component (c) or for the preparation of the component (c) has an ethylene content of 30-95% by weight, preferably 60-90% by weight. As the α-olefin component, there are used those having 3-20 carbon atoms, such as propylene, 1-butene, 1-hexene, 4-methyl-1-pentene, 1-decene and the like. These α-olefin components can be used alone or in admixture of two or more. The ethylene-α-olefin copolymer rubber may further contain a very small amount of a diene, optionally.

The graft monomer used for grafting the ethylene-α-olefin copolymer rubber to obtain a modified ethylene-α-olefin copolymer rubber is the same unsaturated carboxylic acid or derivative thereof as used for grafting the crystalline polypropylene to obtain a modified polypropylene. As the grafting initiator, there can be used radical-generating compounds, for example, the same organic peroxides as mentioned previously. Optionally, the grafting may be effected only by heating, using no initiator. The modified ethylene-α-olefin copolymer rubber can be produced by mixing, with heating, an ethylene-α-olefin copolymer rubber and a graft monomer in a solvent in the presence of an initiator, or by melt kneading, with heating, an ethylene-α-olefin copolymer rubber and a graft monomer. The modified ethylene-α-olefin copolymer rubber is produced so as to have a grafting degree of about 0.05-5.0% by weight, preferably about 0.1-3.0% by weight and a melt index of about 0.01-20 g/10 min, preferably 0.05-15 g/10 min, by appropriately selecting the proportions of materials and the grafting conditions.

When the grafting degree of the modified ethylene-α-olefin copolymer rubber is less than 0.05% by weight, no grafting effect is obtained. When the grafting degree is more than 5.0% by weight, the crosslinking degree of rubber becomes too high at the time of grafting, making difficult the melt mixing of the modified ethylene-α-olefin copolymer rubber with other components.

The grafting of the crystalline polypropylene and the grafting of the ethylene-α-olefin copolymer rubber can be conducted independently. However, the two graftings may be conducted simultaneously; that is, the polypropylene and the ethylene-α-olefin copolymer rubber are mixed, the graft monomer and the grafting initiator are added, and grafting is effected in one stage.

The component (d) used in the present invention is a block copolymer represented by the general formula A—(B—A)$_n$ a hydrogenated block copolymer obtained by hydrogenating said block copolymer, or a modified block copolymer obtained by grafting said block copolymer with an unsaturated carboxylic acid or/and a derivative of an unsaturated carboxylic acid. In the above general formula, A is a polymer block of a monovinyl-substituted aromatic hydrocarbon, B is an elastomeric polymer block of a conjugated diene, and n is an integer of 1-5.

The monovinyl-substituted aromatic hydrocarbon monomer constituting the polymer block A is preferably styrene, but may be a lower alkyl-substituted styrene (e.g. α-methylstyrene, vinyltoluene) or vinylnaphthalene. The conjugated diene monomer constituting the polymer block B is preferably butadiene or isoprene, but may be their mixture. When butadiene is used as an only conjugated diene monomer for formation of the polymer block B, it is preferable to adopt such polymerization conditions as to allow the resulting polybutadiene block to contain a 1,2-microstructure in an amount of 20-50%, preferably 35-45%, in order for the obtained block copolymer to retain an elastomeric property after hydrogenation (i.e. saturation of double bonds).

In the block copolymer, it is preferable that the polymer block A have a weight-average molecular weight of 5,000-125,000 and the polymer block B have a weight-average molecular weight of 15,000-250,000.

Many methods have been proposed for production of the above block copolymer. A typical method is described in Japanese Patent Publication No. 23798/1965, wherein block copolymerization is effected in an inert solvent in the presence of a lithium catalyst or a Ziegler type catalyst.

The hydrogenation of the block copolymer is effected by hydrogenating the block copolymer in an inert solvent in the presence of a hydrogenation catalyst according to the method described in, for example, Japanese Patent Publication No. 8704/1967, 6636/1968 or 20814/1971. In this hyrogenation, there are hydrogenated at least 50%, preferably at least 80% of the olefinic double bonds in the polymer block B and 25% or less of the aromatic unsaturated bonds in the polymer block A.

The above mentioned component (d) includes, for example, styrene-butadiene-styrene block copolymer (SBS), styrene-isoprene-styrene block copolymer (SIS), hydrogenated SBS (SEBS), and hydrogenated SIS (SEPS).

In the preparation of the modified block copolymer, the graft monomer, grafting initiator, grafting method, grafting degree, etc. used are the same as those used in the preparation of the modified ethylene-α-olefin copolymer rubber. The block copolymer, the hydrogenated block copolymer and the modified block copolymer can be used alone or in admixture of two or more. The component (d) may be used in combination with the component (c).

The inorganic filler used as the component (e) in the present invention is a powdery filler or a fibrous filler. As the powdery filler, there can be mentioned, for example, metal oxides such as alumina, magnesium oxide, calcium oxide, zinc oxide and the like; hydrated metal oxides such as aluminum hydroxide, magnesium hydroxide, calcium hydroxide, hydrated tin oxide and the like; metal carbonates such as calcium carbonate, magnesium carbonate and the like; metal silicates such as talc, clay, bentonite and the like; metal botates such as barium borate and the like; metal phosphates such as aluminum phosphate and the like; metal sulfates such as barium sulfate and the like; and mixtures of two or more of them. As the fibrous filler, there can be mentioned, for example, a glass fiber, a potassium titanate fiber, a ceramic fiber, wollastonite, a carbon fiber, a stainless steel fiber, MOS.HIGE ®, glass beads, glass flakes and mica. The inorganic filler may have been surface-treated with a silane compound (e.g. vinylethoxysilane, 2-aminopropyltriethoxysilane, 2-glycidoxypropyltrimethoxysilane), a titanate compound, etc. Of the above fillers, a glass fiber is particularly preferable.

The thermoplastic resin composition of the present invention comprises:
95-5% by weight, preferably 80-20% by weight of (a) a modified polypropylene obtained by grafting a crystalline polypropylene with an unsaturated carboxylic acid or/and a derivative of an unsaturated carboxylic acid, or a crystalline polypropylene comprising at least 5% by weight of said modified polypropylene, and
5-95% by weight, preferably 20-80% by weight of (b) a modified polyamide obtained by partially or wholly modifying a polyamide with a clay mineral.

When the proportion of the component (b) is less than 5% by weight, the resulting composition has no effect of improvement in heat resistance, impact resistance, etc. possessed by the modified polyamide. When the proportion is more than 95% by weight, the resulting composition has no effect of improvement in moisture resistance, chemical resistance, etc. possessed by the polypropylene.

Also, the thermoplastic resin composition of the present invention comprises:
100 parts by weight of the above thermoplastic resin composition comprising the components (a) and (b), and
1-100 parts by weight, preferably 3-30 parts by weight of (c) an ethylene-α-olefin copolymer rubber or a modified etylene-α-olefin copolymer rubber obtained by partially or wholly grafting an ethylene-α-olefin copolymer rubber with an unsaturated carboxylic acid or/and a derivative of an unsaturated carboxylic acid; or,
100 parts by weight of the above thermoplastic resin composition comprising the components (a) and (b), and
1-100 parts by weight, preferably 3-40 parts by weight of (d) a block copolymer represented by the formula A—(B—A)$_n$(A is a polymer block of a monovinyl-substituted aromatic hydrocarbon, B is an elastomeric polymer block of a conjugated diene, and n is an integer of 1-5), a hydrogenated block copolymer obtained by hydrogenating said block copolymer, or a modified block copolymer obtained by grafting said block copolymer with an unsaturated carboxylic acid or/and a derivative of an unsaturated carboxylic acid; or,
100 parts by weight of the above thermoplastic resin composition comprising the components (a) and (b), and
5-150 parts by weight, preferably 10-100 parts by weight of (e) and inorganic filler.

When the proportion of the component (c) or (d) is less than 1 part by weight, the resulting composition has no effect of improvement in impact resistance. When the proportion is more than 100 parts by weight, the composition is remarkably deteriorated in rigidity, heat resistance, moldability, etc. When the proportion of the component (e) is less than 5 parts by weight, the resulting composition has substantially no effect of improvement in rigidity and heat resistance. When the proportion is more than 150 parts by weight, the composition has very low moldability. The components (c), (d) and (e) can be used with the thermoplastic resin composition comprising the components (a) and (b), alone or, optionally, in any combination, for example components (c) and (e), (d) and (e) or (c), (d) and (e).

Where the components (c) and (d) are together employed for the thermoplastic resin composition, their total proportion is 1-100 parts by weight to 100 parts by weight of the components (a) and (b).

The thermoplastic resin composition of the present invention can be prepared by dry blending (a) a modified polypropylene or a crystalline polypropylene comprising said modified polypropylene, (b) a modified polyamide and, optionally, one or any combination of (c) and ethylene-α-olefin copolymer rubber or a modified ethylene-α-olefin copolymer rubber, (d) a block copolymer, a hydrogenated block copolymer or a modified block copolymer and (e) an inorganic filler, each in said proportion, using a known means such as Henschel mixer, V-blender, ribbon blender, tumbler blender or the like, melt mixing the dry blended product using a single-screw extruder, a double-screw extruder, a double-screw extruder having, in addition to an ordinary material inlet, a material inlet at the cylinder portion, a kneader, a Banbury mixer or the like, and pelletizing the melt mixed product.

The thermoplastic resin composition of the present invention may further comprise various addition such as antioxidant, ultraviolet absorber, lubricant, pigment, antistatic agent, copper-harm inhibitor, flame retardant, neutralizing agent, plasticizer, nucleating agent, dye, foaming agent, slip agent and the like, in such amounts that the object of the present invention is not impaired.

In the thermoplastic resin composition of the present invention, there is used a modified polyamide significantly improved in heat resistance, rigidity and cohesiveness among molecules, in order to increase its dispersibility in crystalline polypropylene; there is also used a modified polypropylene. As a result. The resin composition is significantly improved in heat resistance and impact resistance.

Thus, the thermoplastic resin composition of the present invention has a very excellent balance in rigidity, heat resistance and impact resistance; moreover is significantly improved in mar resistance, moldability, warpage and appearance of molded article, etc.; accordingly is suitable for use in interior or exterior trim parts of automobiles (e.g. fender, bumper, wheel cap, spoiler, instrument panel), parts of home electric appliances, industrial parts (e.g. mechanical parts) and other applications requiring both heat resistance and impact resistance.

The present invention is described in more detail below by way of Examples. However, the present invention is not restricted to these Examples.

In the Examples, the following test items were measured by the following test methods.
Tensile properties Tensile yield strength (TYS) (kg/cm$^2$)
Measured by ASTM D 638.
Flexural properties
Flexural strength (FS) (kg/cm$^2$)
Measured by ASTM D 2584.
Flexural modulus (FM) (kg/cm$^2$)
Measured by ASTM D 2584.
Izod impact strength (IZOD) (kg.cm/cm)
Measured by ASTM D 256 (notched).
Heat deformation temperature (HDT) (°C.)
Measured by ASTM D 648.
Rockwell hardness (RH) (−)
Measured by ASTM D 785.
High speed impact strength (HIS) (−)
Measured by the following method (UBE method).

That is, a disc of 100 mm in diameter and 1.6 mm in thickness was formed to use as a test piece. On this test piece was dropped a round missile at a speed of 2.5 m/sec at −30° C., and there was obtained a stress-strain curve. The high speed impact strength of the test piece was calculated from the area of the stress-strain curve when breakage occurred.

EXAMPLE 1

100 parts by weight of a crystalline ethylene-propylene block copolymer having a melt index of 1.0 g/10 min and an ethylene content of 10% by weight was melt mixed with 0.2 part by weight of maleic anhydride and 0.2 part by weight of tert-butyl peroxybenzoate to obtain a modified polypropylene (hereinafter referred to as MPP-1). Using a V-blender, there were dry blended 30% by weight of this MPP-1, 30% by weight of a crystalline ethylene-propylene block copolymer (hereinafter referred to as PP-1) having a melt index of 5.0 g/10 min and an ethylene content of 10% by weight, and 40% by weight of a modified polyamide (hereinafter referred to as MPA-1). The dry blended product was melt mixed using a single-screw extruder having a screw diameter of 65 mm. The melt mixed product was then pelletized. The pellets were dried in a vacuum drier and injection molded at 270° C. to prepare a test piece for measurement of physical properties.

The modified polyamide (MPA-1) used in this Example was prepared as follows.

100 g of montmorillonite (a layer structure silicate) whose layer had an average thickness of 9.5 Å and an average length of one side of about 0.1 μm was dispersed in 10 liters of water. Thereto were added 51.2 g of 12-aminododecanoic acid and 24 ml of concentrated hydrochloric acid. The mixture was stirred for 5 minutes and filtered, followed by through washing and vacuum drying, to prepare a composite material between ammonium 12-aminododecanoate and montmorillonite.

In a reactor provided with a stirrer were placed 10 kg of ε-caprolactam, 1 kg of water and 200 g of the above composite material (dried). The mixture were stirred at 100° C. until it reached a uniform state. The temperature was increased to 260° C. and the reactor contents were stirred for 1 hour at a pressure of 15 kg/cm$^2$. The pressure was released and a reaction was effected for 3 hours at atmospheric pressure while evaporating water from the reactor. After the completion of the reaction, the reaction product was taken out from the nozzle at the bottom of the reactor, in the form of strands. The strands were water cooled and cut to obtain modified polyamide pellets consisting of a polyamide having an average molecular weight of 15,000 and montmorillonite. The pellets were immersed in hot water to extract the unreacterd monomer and then dried in a vacuum drier.

EXAMPLES 2 AND 3

There was repeated the same procedure as in Example 1 except that the proportions of PP-1 and MPA-1 were changed as shown in Table 1.

EXAMPLE 4

In the same manner as in Example 1 there were pelletized 30% by weight of MMP-1, 25% by weight of PP-1, 40% by weight of MPA-1, and 5% by weight of a modified ethylene-propylene copolymer rubber (hereinafter referred to MEPR-1) having a melt index of 0.7 g/10 min at 230° C. which was obtained by subjecting 100 parts by weight of an ethylene-propylene copolymer rubber having a Mooney viscosity ML$_{1+4}$ (100° C.) of 50 and an ethylene content of 73% by weight, 0.8 part of maleic anhydride and 0.4 part of dicumyl peroxide to a graft reaction at 100° C. in paraxylene. The pellets were injection molded to obtain a test piece.

EXAMPLE 5

There was repeated the same procedure as in Example 4 except that MEPR-1 was replaced by a block copolymer SEBS [Kraton G 1657 (trade name) manufactured by Shell Chemical].

EXAMPLE 6

In the same manner as in Example 1 there were pelletized 32% by weight of a modified polypropylene (hereinafter referred to as MPP-2) obtained by melt mixing 100 parts by weight of a crystalline propylene homopolymer having a melt index of 1.0 g/10 min, 0.2 part of maleic anhydride and 0.2 part by weight of tert-butyl peroxybenzoate, 48% by weight of MPA-1 and 20% by weight of a glass fiber (hereinafter referred to as GF) having a length of 3 mm and a diameter of 11μ, whereby a test piece was obtained.

COMPARATIVE EXAMPLE 1

There was repeated the same procedure as in Example 1 except that MPA-1 was replaced by ordinary nylon-6 (hereinafter referred to as PA-1) having an average molecular weight of 15,000.

COMPARATIVE EXAMPLE 2

There was repeated the same procedure as in Example 4 except that MPA-1 was replaced by PA-1.

COMPARATIVE EXAMPLE 3

There was repeated the same procedure as in Example 5 except that MPA-1 was replaced by PA-1.

COMPARATIVE EXAMPLE 4

There was repeated the same procedure as in Example 4 except that MPA-1 was replaced by ordinary nylon-6,6 (hereinafter referred to as PA-2) having an average molecular weight of 20,000.

COMPARATIVE EXAMPLE 5

There was repeated the same procedure as in Example 6 except that MPA-1 was replaced by ordinary nylon-6 (hereinafter referred to as PA-3) having an average molecular weight of 11,000.

COMPARATIVE EXAMPLE 6

There was repeated the same procedure as in Example 1 except that MPA-1 was replaced by a product (hereinafter referred to as PA-4) obtained by melt mixing 98% by weight of PA-1 and 2% by weight of montmorillonite.

The results of Examples 1-6 and Comparative Examples 1-6 are shown in Table 1.

EXAMPLES 7-11 AND COMPARATIVE EXAMPLES 7-11

The same procedure as the above Examples was applied for the components and proportions shown in Table 2. In Examples 9-11 and Comparative Examples 9-11, GF was replaced by talc powder.

The results are shown in Table 2.

TABLE 1

| | | Example | | | | | |
|---|---|---|---|---|---|---|---|
| | | 1 | 2 | 3 | 4 | 5 | 6 |
| Composition (wt. %) | MPP-1 | 30 | 30 | 30 | 30 | 30 | — |
| | MPP-2 | — | — | — | — | — | 32 |
| | PP-1 | 30 | 50 | 10 | 25 | 25 | — |
| | MPA-1 | 40 | 20 | 60 | 40 | 40 | 48 |
| | PA-1 | — | — | — | — | — | — |
| | PA-2 | — | — | — | — | — | — |
| | PA-3 | — | — | — | — | — | — |
| | PA-4 | — | — | — | — | — | — |
| | MEPR-1 | — | — | — | 5 | — | — |
| | SEBS | — | — | — | — | 5 | — |
| | GF | — | — | — | — | — | 20 |
| Specific Gravity | | 0.98 | 0.94 | 1.03 | 0.97 | 0.98 | 1.17 |
| TYS | 23°C. | 390 | 330 | 450 | 360 | 350 | 1500 |
| FS | | 680 | 550 | 770 | 580 | 570 | 1900 |
| FM | | 23000 | 19000 | 26000 | 18500 | 17500 | 44500 |
| IZOD | 23° C. | — | — | — | — | — | 15 |
| | −30° C. | 8 | 7 | 11 | 18 | 21 | — |
| HDT | 4.6 | 140 | 134 | 150 | 135 | 133 | — |
| | 18.5 | — | — | — | — | — | 200 |
| RH | 25° C. | 103 | 98 | 105 | 92 | 90 | 119 |
| HSI | −30° C. | 380 | 260 | 420 | 750 | 730 | — |

| | | Comparative Example | | | | | |
|---|---|---|---|---|---|---|---|
| | | 1 | 2 | 3 | 4 | 5 | 6 |
| Composition (wt. %) | MPP-1 | 30 | 30 | 30 | 30 | — | 30 |
| | MPP-2 | — | — | — | — | 32 | 13 |
| | PP-1 | 30 | 25 | 25 | 25 | — | 30 |
| | MPA-1 | — | — | — | — | — | — |
| | PA-1 | 40 | 40 | 40 | — | — | — |
| | PA-2 | — | — | — | 40 | — | — |
| | PA-3 | — | — | — | — | 48 | — |
| | PA-4 | — | — | — | — | — | 40 |
| | MEPR-1 | — | 5 | — | 5 | — | — |
| | SEBS | — | — | 5 | — | — | — |
| | GF | — | — | — | — | 20 | — |
| Specific Gravity | | 0.98 | 0.97 | 0.98 | 0.97 | 1.17 | 0.98 |
| TYS | 23°C. | 380 | 350 | 330 | 330 | 1200 | 390 |
| FS | | 650 | 570 | 540 | 550 | 1650 | 670 |
| FM | | 20000 | 16500 | 16000 | 16500 | 43500 | 23200 |
| IZOD | 23° C. | — | — | — | — | 12 | — |
| | −30° C. | 8 | 15 | 18 | 13 | — | 6 |
| HDT | 4.6 | 130 | 125 | 123 | 135 | — | 140 |
| | 18.5 | — | — | — | — | 190 | — |
| RH | 25° C. | 100 | 90 | 88 | 90 | 118 | 103 |
| HSI | −30° C. | 150 | 650 | 600 | 500 | — | 130 |

TABLE 2

| | | Example | | | | |
|---|---|---|---|---|---|---|
| | | 7 | 8 | 9 | 10 | 11 |
| Composition (wt. %) | MPP-1 | 20 | 20 | 20 | 20 | 20 |
| | MPP-2 | — | — | — | — | — |
| | PP-1 | 50 | 50 | 30 | 30 | 30 |
| | MPA-1 | 20 | 20 | 20 | 20 | 20 |
| | PA-1 | — | — | — | — | — |
| | PA-2 | — | — | — | — | — |
| | PA-3 | — | — | — | — | — |
| | PA-4 | — | — | — | — | — |
| | MEPR-1 | 10 | 5 | 10 | 5 | — |
| | SEBS | — | 5 | — | 5 | 10 |
| | GF | — | — | — | — | — |
| | Talc | — | — | 20 | 20 | 20 |
| Specific Gravity | | 0.93 | 0.93 | 1.05 | 1.05 | 1.05 |
| TYS | 23°C. | 257 | 250 | 255 | 251 | 247 |
| FS | | 403 | 387 | 431 | 425 | 409 |
| FM | | 13800 | 13100 | 25200 | 24600 | 23700 |

TABLE 2-continued

|  |  | | | | | |
|---|---|---|---|---|---|---|
| IZOD | 23° C. | — | — | — | — | — |
|  | −30° C. | 13 | 15 | 11 | 13 | 14 |
| HDT | 4.6 | 122 | 120 | 129 | 125 | 123 |
|  | 18.5 | — | — | — | — | — |
| RH | 25° C. | 76 | 74 | 78 | 76 | 76 |
| HSI | −30° C. | 580 | 620 | 510 | 560 | 570 |

|  |  | Comparative Example | | | | |
|---|---|---|---|---|---|---|
|  |  | 7 | 8 | 9 | 10 | 11 |
| Composition (wt. %) | MPP-1 | 20 | 20 | 20 | 20 | 20 |
|  | MPP-2 | — | — | — | — | 13 |
|  | PP-1 | 50 | 50 | 30 | 30 | 30 |
|  | MPA-1 | — | — | — | — | — |
|  | PA-1 | 20 | 20 | 20 | 20 | 20 |
|  | PA-2 | — | — | — | — | — |
|  | PA-3 | — | — | — | — | — |
|  | PA-4 | — | — | — | — | — |
|  | MEPR-1 | 10 | 5 | 10 | 5 | — |
|  | SEBS | — | 5 | — | 5 | 10 |
|  | GF | — | — | — | — | — |
|  | Talc | — | — | 20 | 20 | 20 |
| Specific Gravity |  | 0.93 | 0.93 | 1.05 | 1.05 | 1.05 |
| TYS | 23°C. | 251 | 247 | 252 | 245 | 242 |
| FS |  | 393 | 379 | 425 | 414 | 410 |
| FM |  | 12800 | 12300 | 24100 | 23000 | 22700 |
| IZOD | 23° C. | — | — | — | — | — |
|  | −30° C. | 10 | 12 | 7 | 8 | 9 |
| HDT | 4.6 | 115 | 111 | 126 | 123 | 121 |
|  | 18.5 | — | — | — | — | — |
| RH | 25° C. | 72 | 70 | 73 | 71 | 70 |
| HSI | −30° C. | 460 | 540 | 390 | 410 | 420 |

As is clear from Table 1 and Table 2, the polypropylene thermoplastic resin compositions of the present invention comprising a particular modified polyamide, as compared with conventional polypropylene thermoplastic resin compositions comprising a polyamide, are very superior in heat resistance and impact resistance.

What is claimed is:

1. A polypropylene thermoplastic resin composition comprising:
   100 parts by weight of a polypropylene thermoplastic resin composition comprising 95-5% by weight of (a) a modified polypropylene obtained by grafting a crystalline polypropylene with 0.05 to 5% by weight of an unsaturated carboxylic acid and/or an acid anhydride, ester, salt or amide of an unsaturated carboxylic acid, or a crystalline polypropylene comprising at least 5% by weight of said modified polypropylene, and 5-95% by weight of (b) a modified polyamide obtained by partially or wholly modifying a polyamide with 0.05 to 10% by weight of a clay mineral, and
   1-100 parts by weight of (c) an ethylene-α-olefin copolymer rubber or a modified ethylene-α-olefin copolymer rubber obtained by partially or wholly grafting an ethylene-α-olefin copolymer rubber with an unsaturated carboxylic acid and/or a derivative of an unsaturated carboxylic acid.

2. A polypropylene thermoplastic resin composition according to claim 1, wherein the modified ethylene-α-olefin copolymer rubber has a grafting degree of 0.05-5.0% by weight and a melt index of 0.01-20 g/10 min.

3. A polypropylene thermoplastic resin composition comprising:
   100 parts by weight of a polypropylene thermoplastic resin composition comprising 95-5% by weight of (a) a modified polypropylene obtained by grafting a crystalline polypropylene with 0.05 to 5% by weight of an unsaturated carboxylic acid and/or an acid anhydride, ester, salt or amide of an unsaturated carboxylic acid, or a crystalline polypropylene comprising at least 5% by weight of said modified polypropylene, and 5-95% by weight of (b) a modified polyamide obtained by partially or wholly modifying a polyamide with 0.05 to 10% by weight of a clay mineral, and
   1-100 parts by weight of (d) a block copolymer represented by the formula A—(B—A)$_n$ (A polymer block of a monovinyl-substituted aromatic hydrocarbon, B is an elastomeric polymer block of a conjugated diene, and n is an integer of 1-5), a hydrogenated block copolymer obtained by hydrogenating said block copolymer, or a modified block copolymer obtained by grafting said block copolymer with an unsaturated carboxylic acid and/or a derivative of an unsaturated carboxylic acid.

4. A polypropylene thermoplastic resin composition according to claim 3, wherein the monovinyl-substituted aromatic hydrocarbon is styrene, α-methylstyrene, vinyltoluene or vinylnaphthalene and the conjugated diene is butadiene or/and isoprene.

5. A polypropylene thermoplastic resin composition comprising:
   100 parts by weight of a polypropylene thermoplastic resin composition comprising 95-5% by weight of (a) a modified polypropylene obtained by grafting a crystalline polypropylene with 0.05 to 5% by weight of an unsaturated carboxylic acid and/or an acid anhydride, ester, salt or amide of an unsaturated carboxylic acid, or a crystalline polypropylene comprising at least 5% by weight of said modified polypropylene, and 5-95% by weight of (b) a modified polyamide obtained by partially or wholly modifying a polyamide with 0.05 to 10% by weight of a clay mineral, and
   any combination of 1-100 parts by weight of (c) an ethylene-α-olefin copolymer rubber or a modified ethylene-α-olefin copolymer rubber obtained by partially or wholly grafting an ethylene-α-olefin copolymer rubber with an unsaturated carboxylic acid and/or a derivative of an unsaturated carboxylic acid, 1-100 parts by weight of (d) a block copolymer represented by the general formula A—(B—A)$_n$ (A is a polymer block of a monovinyl-substituted aromatic hydrocarbon, B is an elastomeric polymer block of a conjugated diene, and n is an integer of 1-5), a hydrogenated block copolymer obtained by hydrogenating said block copolymer, or a modified block copolymer obtained by grafting said block copolymer with an unsaturated carboxylic acid and/or a derivative of an unsaturated carboxylic acid, and 5-150 parts by weight of (e) an inorganic filler.

* * * * *